United States Patent
Weckwerth et al.

(10) Patent No.: US 9,086,940 B2
(45) Date of Patent: Jul. 21, 2015

(54) INCLUSION OF CUSTOMER-SPECIFIC TRANSPORT REQUESTS IN SOFTWARE ARCHITECTURE UPDATE PROCEDURES

(71) Applicants: Tamara Weckwerth, Wiesloch (DE); Stefan Mueller, Walldorf (DE); Joerg Schoen, Nussloch (DE)

(72) Inventors: Tamara Weckwerth, Wiesloch (DE); Stefan Mueller, Walldorf (DE); Joerg Schoen, Nussloch (DE)

(73) Assignee: SAP SE, Walldorf (DE)

( * ) Notice: Subject to any disclaimer, the term of this patent is extended or adjusted under 35 U.S.C. 154(b) by 236 days.

(21) Appl. No.: 13/706,315

(22) Filed: Dec. 5, 2012

(65) Prior Publication Data
US 2014/0157252 A1 Jun. 5, 2014

(51) Int. Cl.
*G06F 9/44* (2006.01)
*G06F 9/445* (2006.01)

(52) U.S. Cl.
CPC .... *G06F 8/65* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 7,546,314 B1 * | 6/2009 | Lakner et al. | 1/1 |
| 7,694,292 B2 * | 4/2010 | Mueller et al. | 717/170 |
| 8,392,908 B2 * | 3/2013 | Laicher et al. | 717/172 |
| 8,527,471 B2 * | 9/2013 | Hoprich et al. | 707/674 |
| 2003/0130985 A1 * | 7/2003 | Driesen et al. | 707/1 |
| 2007/0220065 A1 * | 9/2007 | Coyle et al. | 707/203 |
| 2009/0183145 A1 * | 7/2009 | Hu et al. | 717/168 |
| 2012/0030663 A1 * | 2/2012 | Schmidt et al. | 717/170 |
| 2012/0030666 A1 * | 2/2012 | Laicher et al. | 717/173 |
| 2012/0174085 A1 * | 7/2012 | Driesen et al. | 717/168 |
| 2012/0174087 A1 * | 7/2012 | Bentzien et al. | 717/169 |

* cited by examiner

*Primary Examiner* — Don Wong
*Assistant Examiner* — Roberto E Luna
(74) *Attorney, Agent, or Firm* — Mintz Levin Cohn Ferris Glovsky and Popeo, P.C.

(57) ABSTRACT

In contrast to conventional approaches in which an update to a business software architecture generally involves performing update procedures during a period of business downtime followed by an import of customer-specific transport requests also during business downtime, the current subject matter can facilitate import of the customer transport requests in parallel with update to a core software platform of the business software architecture.

19 Claims, 9 Drawing Sheets

INCLUSION OF CUSTOMER-SPECIFIC TRANSPORT REQUESTS IN SOFTWARE ARCHITECTURE UPDATE PROCEDURES

TECHNICAL FIELD

The subject matter described herein relates to update procedures for software architectures.

BACKGROUND

A transport request in a software architecture can refer to a technique via which changes can be recorded and moved across systems. Software architectures, in particular business software architectures such as for example enterprise resource planning (ERP) systems, can in many cases be based on relational database functionality. If changes to the database occur, these changes must be recorded. To move the changes that have been implemented and recorded in one system to another system rather than recreating these changes in the new system, a transport request or similar functionality can record changes to the source system while also generating a unique number or other identifier that can be used to also migrate the transport to the new system. Many business software architectures include functionality to allow a user organization of the architecture to implement one or more customizations to a core software platform provided by a developer of the business software architecture. Such customizations can be added to a system via a customer transport request, where the "customer" is the user organization of the architecture.

A migration of a software architecture or functionality thereof from one physical (or virtual) system to another system can be required under one or more circumstances. For example, during a system upgrade, a "shadow" system can be created on a same system or alternatively on a second system (e.g. on a development system, a test or quality control system, or the like). In some examples, the shadow system can be created on the same system as the productive system. In other words, when a productive system is upgraded, a shadow instance can be created on the computing system that hosts the productive system (either on a same host or on a remote host, but in the same database). The shadow system can receive a copy of a productive system. After the productive system has been copied, the shadow system can undergo the upgrade procedure and be tested for proper operation before the updated architecture is activated for use as the productive system. Such a process generally includes some system downtime even under optimal conditions because the update typically occurs with system downtime followed by an importing of any customer-specific transport requests during further system downtime.

SUMMARY

In a first aspect a method includes creating customer-specific developments based on a target update release in a development system to which an update of a core software platform of a software architecture has been applied. The customer-specific developments include a customization of the core software platform that is specific to a given customer organization using the software architecture. The method further includes updating and testing a quality control or other test system. The updating includes importing customer-specific transport requests representing the customer-specific developments. A productive system is updated to the target update release, which includes importing the customer-specific transport requests to the productive system. The productive system is returned to business use and one or more post processing procedures are executed concurrently with the business use.

In variations of the current subject matter, one or more additional features can optionally be included in any feasible combination. For example, the quality control or other test system can optionally be placed in a downtime state for the updating of the quality control or other test system and returned to an uptime state for the testing of the quality control or other test system. The productive system can optionally be placed in state for the updating of the productive system and can optionally be otherwise available in a business uptime state during the creating of the customer-specific developments and the updating and testing of the quality control or other test system. Customer-specific transport requests can optionally be fitted to a target level of the update. The fitting can optionally occur when the core software platform includes or is based on an ABAP application server. A first dictionary import can optionally be completed for all core software platform packages prior to a second dictionary import for all included customer-specific transport requests. Further import processes can optionally be completed after activation of the first and second dictionary imports.

Implementations of the current subject matter can include, but are not limited to, systems and methods consistent including one or more features as described herein as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

In cases in which a customer has a large number of existing customer-specific transport requests, the downtime required for an upgrade procedure and subsequent importing of the customer-specific transport requests to an upgraded system or an upgraded instance of a system can be substantial. Implementations of the current subject matter can provide one or more benefits relative to previously available approaches by enabling at least some parts of the customer-specific transport requests to be imported into a new or upgraded system during system uptime. For example, one or more parallelization mechanisms available for use in an update or upgrade or system transition procedure can also be used for importing of customer-specific transport requests.

Consistent with implementations of the current subject matter, a software architecture update procedure can include one or more of the following features as part of an approach that reduces total business downtime associated with the update procedure. As used herein, an update can refer to one or more of an update or upgrade of a core platform of a software architecture to a new version, replacement of one core platform with another, etc. An update generally introduces one or more of new or different functionality, data structures, or the like that can affect customizations made by a customer or end user of the business software architecture. For example, an organization using a business software architecture, such as for example an enterprise resource planning program, may add one or more organization-specific customizations, such as for example extensions or the like, that may be affected by an update.

Figure 1:
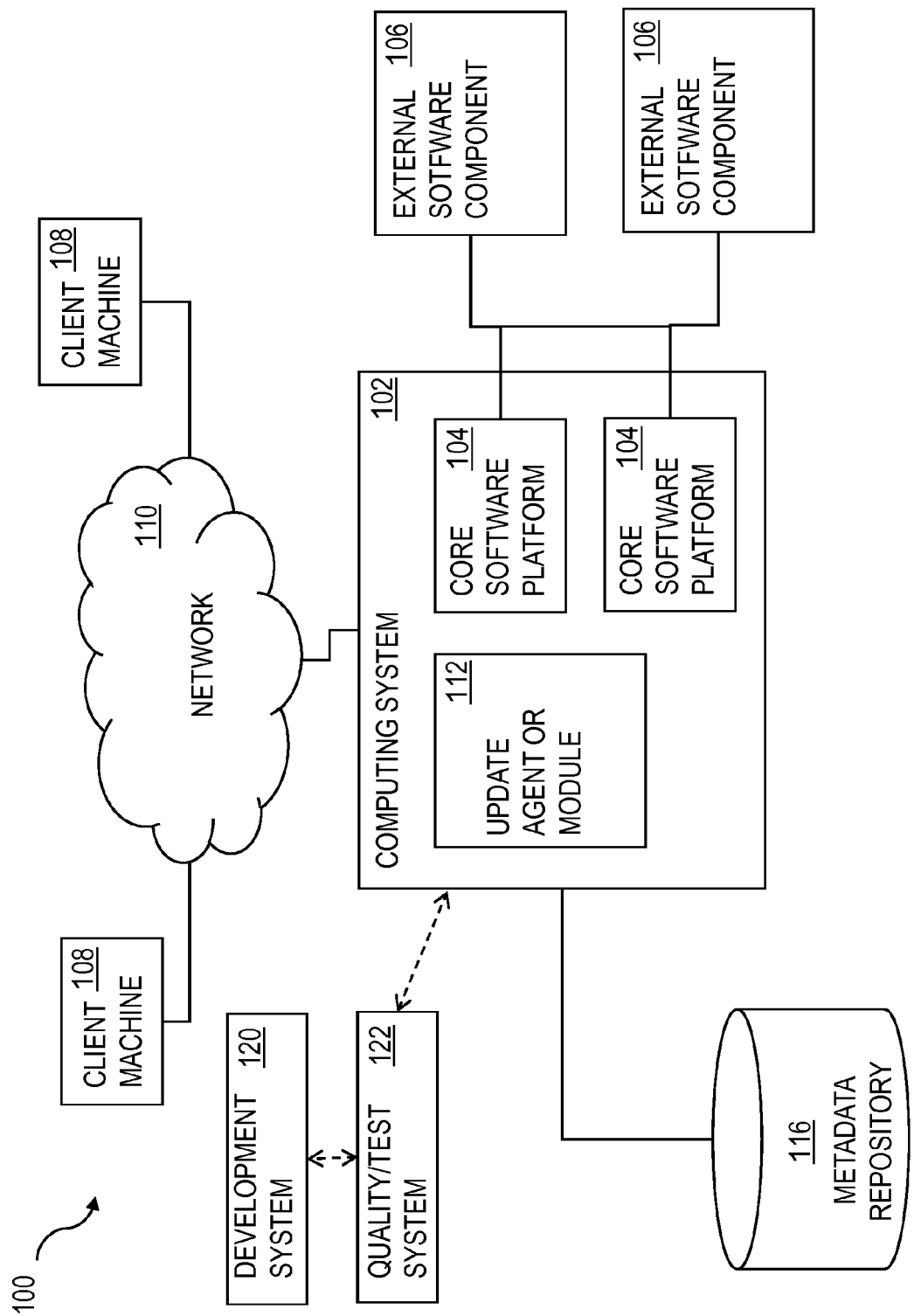
FIG. 1 is a diagram illustrating aspects of a system showing features consistent with implementations of the current subject matter.
Figure 2:
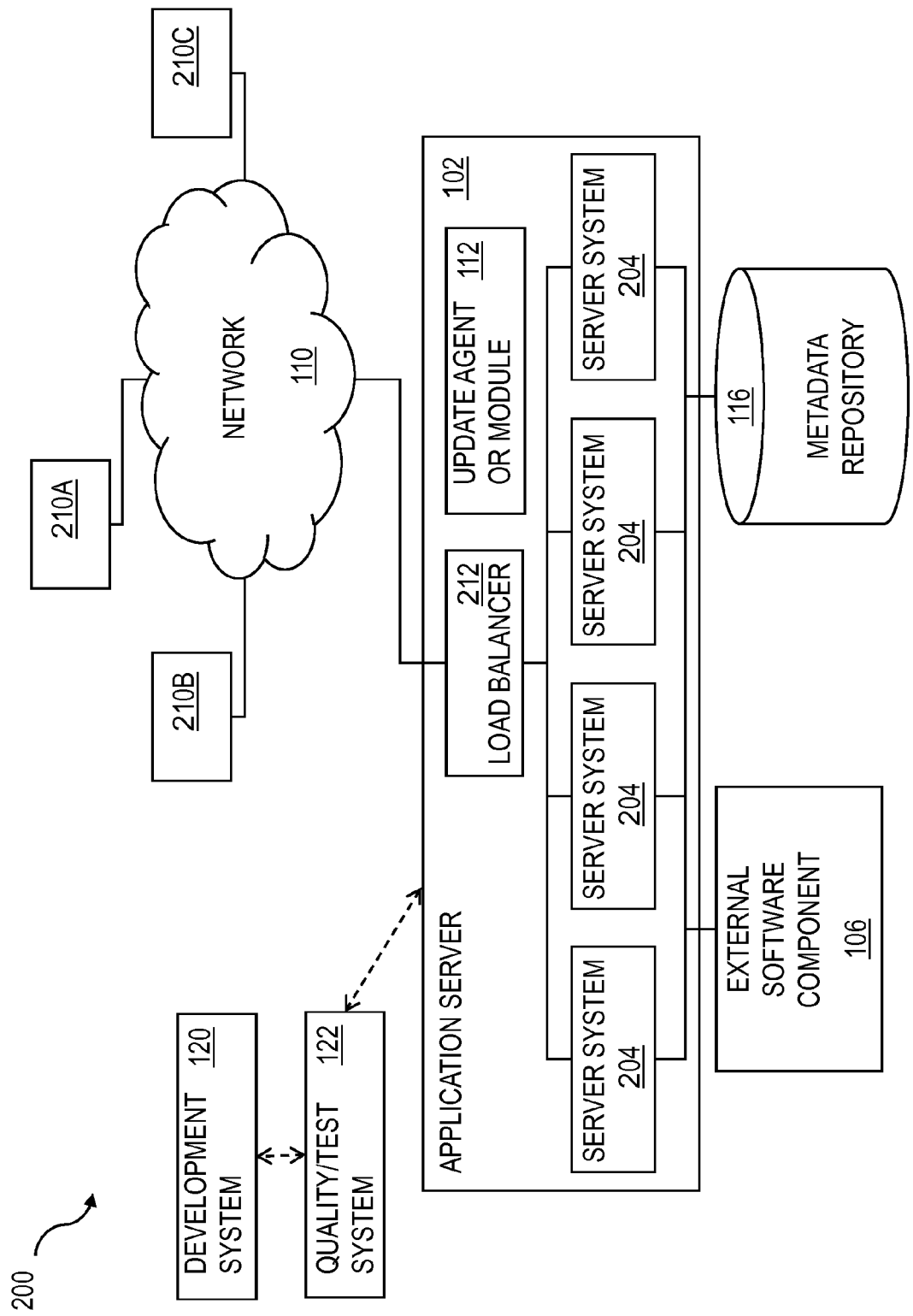
FIG. 2 is a diagram illustrating aspects of another system showing features consistent with implementations of the current subject matter.

A software architecture, such as for example an enterprise resource planning (ERP) system or other business software architecture or the like, can include core platform functionality that is provided by a core platform developer. To better serve the specific needs of a customer organization using the software architecture, a customized software installation can be developed that includes one or more customized features or functionalities implemented through the use of customer-specific transport requests. FIG. 1 and FIG. 2 show diagrams of two architectures 100, 200 consistent with such an implementation. As shown in FIG. 1, a computing system 102 can include one or more core software platform modules 104 providing one or more features of the business software system. The computing system can also aggregate or otherwise provide a gateway via which users can access functionality provided by one or more external software components 106. Client machines 108 can access the computing system, either via a direct connection, a local terminal, or over a network 110 (e.g. a local area network, a wide area network, a wireless network, the Internet, or the like). An update module 112 can be hosted on the computing system 102 or alternatively, on an external system accessible over a network connection. The update module 112 can optionally include one or more discrete software and/or hardware modules that perform operations such as those described herein.

The update module 112 can access one or more metadata repositories and/or other data repositories 116 (e.g. process repositories, scenarios repositories, transactional data repositories, etc.) that can store definitions of business scenarios, business processes, and one or more business configurations as well as data, metadata, master data, etc. relating to definitions of the business scenarios, business processes, and one or more business configurations, and/or concrete instances of the data objects (e.g. business objects) that are relevant to a specific instance of the business scenario or a business process. In some examples, the definition can optionally be stored as a business object. In some implementations, the business object can include a template definition of a standard business process. The template definition that can optionally be modified via one or more extensions that are stored in the one or more metadata repositories 116.

To support update procedures, one or more additional systems can be used. For example, one or more of a development system 120 and a test/quality control system 122 can be used in preparing for an update as discussed in greater detail below.

Smaller organizations can also benefit from use of business software functionality. However, such an organization may lack the necessary hardware resources, IT support, and/or consulting budget necessary to implement a standalone business software architecture in a manner similar to the architecture 100 of FIG. 1 product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

FIG. 2 shows a block diagram of a multi-tenant implementation of a software delivery architecture 200 that includes an application server 102, which can in some implementations include multiple server systems 204 that are accessible over a network 110 from client machines operated by users at each of multiple organizations 210A-210C (referred to herein as "tenants" of a multi-tenant system) supported by a single software delivery architecture 200. For a system in which the application server 202 includes multiple server systems 204, the application server can include a load balancer 212 to distribute requests and actions from users at the one or more organizations 210A-210C to the one or more server systems 204. Instances of the core software platform 104 (not shown in FIG. 2) can be executed in a distributed manner across the server systems 204. A user can access the software delivery architecture across the network using a thin client, such as for example a web browser or the like, or other portal software running on a client machine. The application server 202 can access data and data objects stored in one or more data repositories 116. The application server 202 can also serve as a middleware component via which access is provided to one or more external software components 106 that can be provided by third party developers.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 202 that includes multiple server systems 204 that handle processing loads distributed by a load balancer 212. Potential benefits from such an arrangement can include, but are not limited to, high and reliably continuous application server availability and minimization of unplanned downtime, phased updating of the multiple server systems 204 to permit continuous availability (one server system 204 can be taken offline while the other systems continue to provide services via the load balancer 212), scalability via addition or removal of a server system 204 that is accessed via the load balancer 212, and de-coupled lifecycle processes (such as for example system maintenance, software upgrades, etc.) that enable updating of the core software independently of tenant-specific customizations implemented by individual tenants.

As in the example illustrated in FIG. 1, the metadata repository 116 shown in FIG. 2 can store a business object that represents a template definition of a standard business process. Each individual tenant 210A-210C can customize that standard template according to the individual business process features specific to business of the organization to which that tenant is assigned. Customizations can optionally be stored as extensions in the metadata repository 116. Also as in FIG. 1, one or more of a development system 120 and a test/quality control system 122 can be used in preparing for an update as discussed in greater detail below. An update module 112 can optionally include one or more discrete software and/or hardware modules that perform operations such as those described herein. The update module 112 can access one or more metadata repositories and/or other data repositories 116 in a manner similar to the example of FIG. 1.

Several actions can occur as part of an update of a software architecture. For example, a dictionary import can occur, including importation of dictionary objects of customer-specific transport requests during uptime into a shadow system. Dictionary objects of a core software platform as well as dictionary objects of the customer-specific transport requests can be activated together or otherwise at least approximately simultaneously or in parallel (e.g. as a "merged activation") during uptime in the shadow system. A merged activation as described herein can also reduce the number of duplicate activations (caused by dependencies). As part of a shadow import, various types of non-dictionary repository objects, which can include, but are not limited to programs, classes, function groups, and the like, can be imported from the customer transport requests into the shadow system during uptime.

In some optional variations, during the uptime shadow import, during the downtime main import, or optionally during both, the update procedure can use parallel processes (e.g. using an approach similar to R3trans provided by SAP AG of Walldorf, Germany) for customer-specific transport requests. Activation of dictionary objects (e.g. from core software platform packages and/or customer-specific transport requests) can also be executed with parallel processes. Doubled activations or generations can advantageously be avoided for example by the merged activation activating the objects to be activated together in the correct order. Additionally, no separate (sequential) generation step is required for the customer-specific transport requests. Thus parallel processing can be used for core software platform objects and for customer-specific objects.

Figure 3:
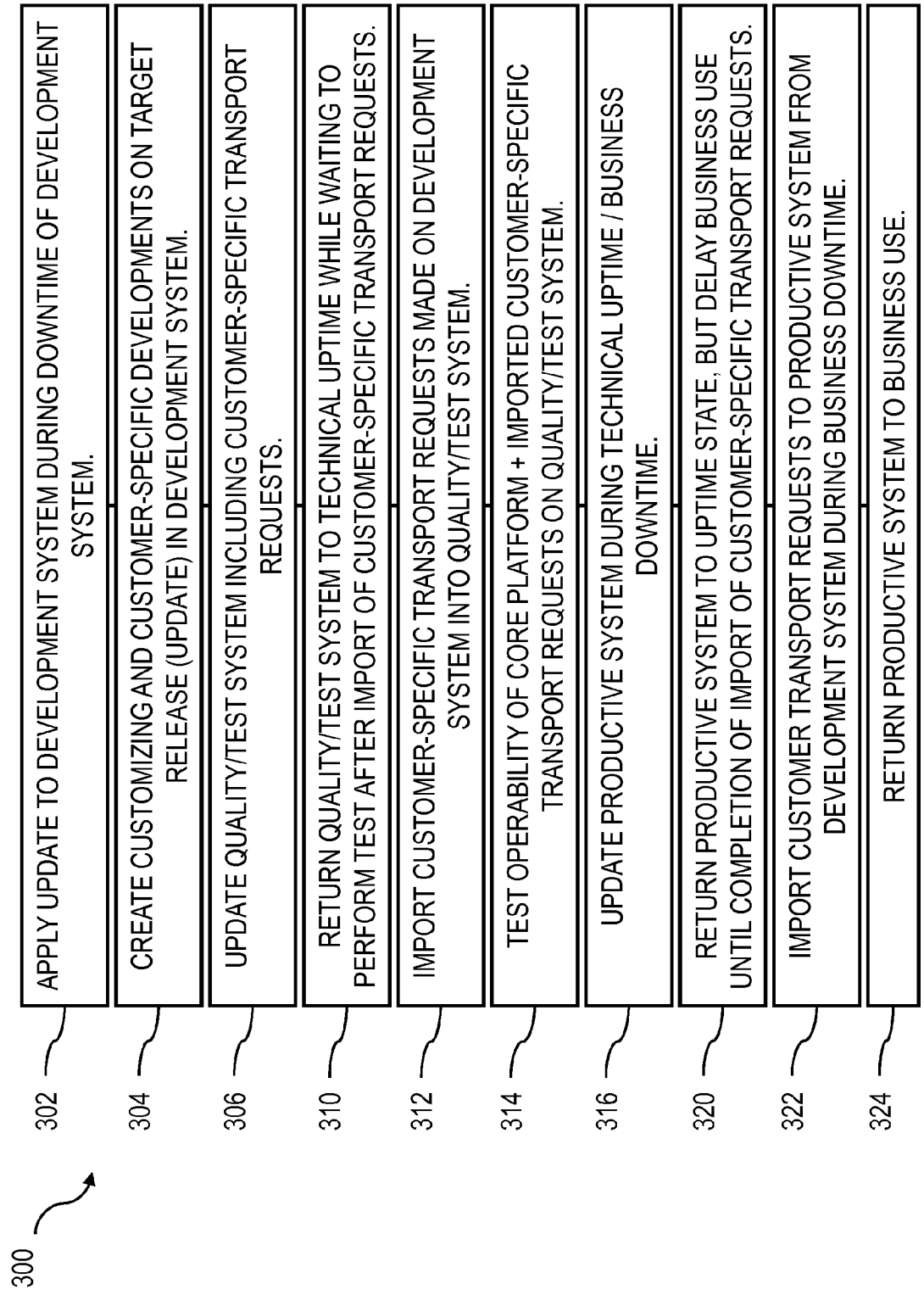
FIG. 3 is a process flow diagram illustrating aspects of a method having one or more features consistent with implementations of the current subject matter.
Figure 4:
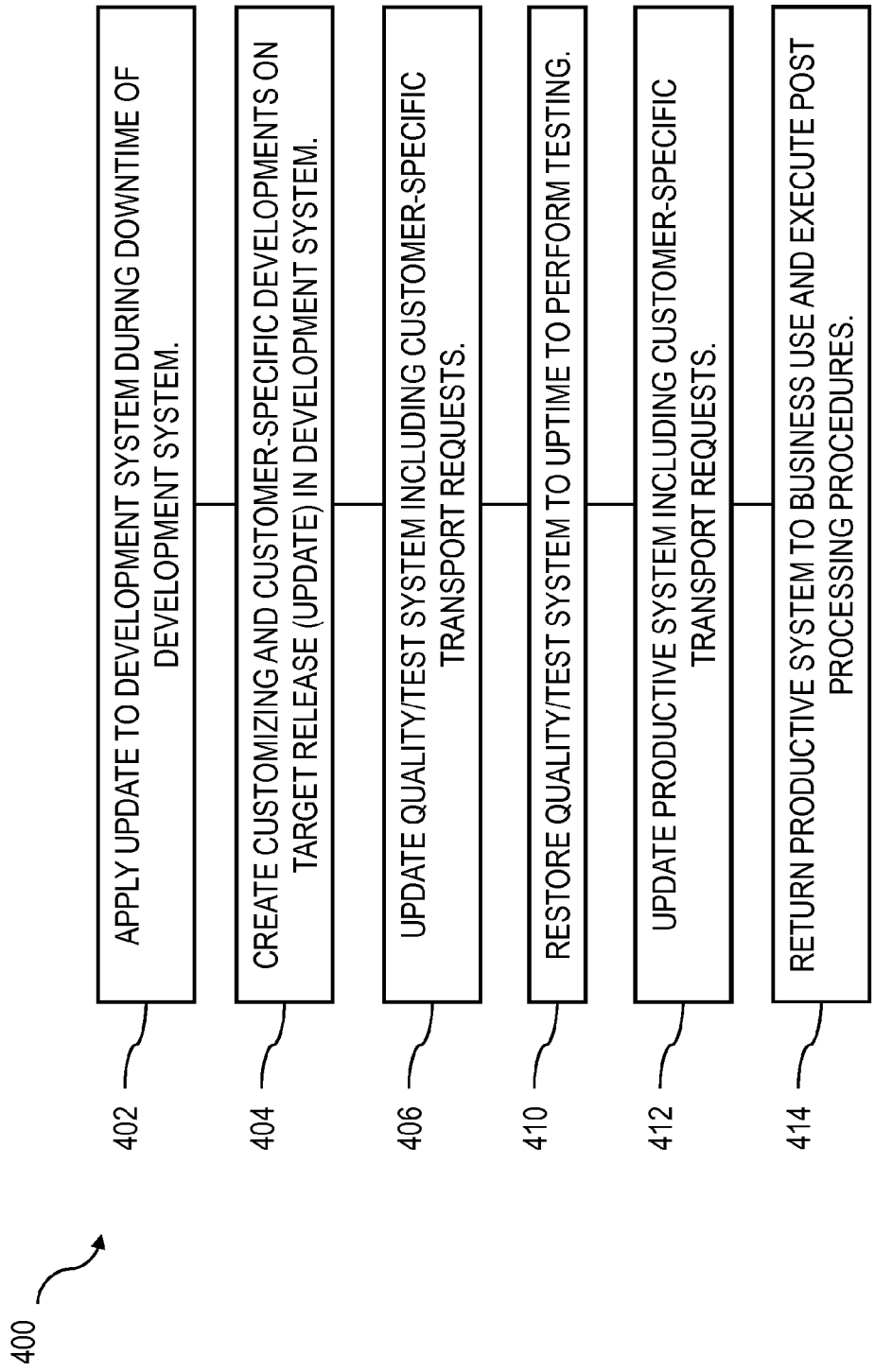
FIG. 4 is a process flow diagram illustrating aspects of another method having one or more features consistent with implementations of the current subject matter.

FIG. 3 shows a flowchart 300 illustrating an example of an approach to a software architecture update. At 302, a development system 120 is taken into a downtime state so that a update to the core software platform (e.g. via an update, deletion, or other change to an existing core software platform module 104; addition of a new core software platform module 104; addition. deletion, or changes to interfaces between two or more core software platform modules 104 or between one or more core software platform modules 104 and one or more external software components; etc. can be applied to the development system. Next, at 304, customizing and customer-specific developments built upon the updated core software platform (e.g. a "target release") are undertaken in the development system 120. In some examples, a customer may have a large volume of customizing and customer-specific development built upon the core software platform. At 306, a quality control or other test system 122 can be updated. This updating of the quality control system 122 can in some cases be done several times (for example with several current copies of the productive system) to test potential configurations or the like.

At 310, the quality control or other test system 122 can be returned to a technical uptime state while waiting for testing after customer-specific transport requests are imported into the quality control or other test system 122, and at 312, those customer-specific transport requests made on the development system 120 are imported into the quality control or other test system 122. Next, the operability of the core software platform with the customer-specific transport requests is tested at 314 on the quality control or other test system 122. Once this testing is completed, at 316 the updates to the core software platform are applied to the productive system during a technical uptime/business downtime state. The productive system is in an uptime state at 320, but remains in business downtime during completion of the importing of customer-specific transport requests to the productive system 102 (e.g. from the control or other test system 122 or from the development system 120). Business operations can result in an error if they are executed while transport requests affecting them are being imported. Therefore, this aspect of the update process of 310 must generally be performed during a business downtime state. At 324, after the update is applied and the customer-specific transport requests are imported, the productive system is returned to business use (e.g. business downtime ends).

As illustrated and described in reference to FIG. 3, an update procedure can include several types of downtime states. For example, an update downtime can be needed regardless of whether customer-specific transport requests are included or not. Update post processing can be performed during a technical uptime because the productive system is generally in a state consistent with the target update. However, because almost all customers need adapted customizing and customer developments in order to be able to use the system for productive operation, this uptime is still business downtime due to the need to import customer-specific transport requests. New versions of transport objects and other customizing features, which were tested in the quality control or other test system, can be made available in the productive system only after the import of customer-specific transport requests is completed. Thus, the importing of the customer-specific transport requests may also be done during a business downtime state under conventional approaches.

In contrast, implementations of the current subject matter can include one or more features that reduce the amount of business downtime required for an update process of a software architecture, in particular a software architecture that includes customer-specific customizations or other features that apply to only a subset of organizations that use customized architectures based upon a core software platform. As shown in the process flow chart 400, a method consistent with implementations of the current subject matter can include one or more features that reduce downtime. In an implementation, an update process can proceed with a development system 120 being taken into a downtime state at 402 so that an update to the core software platform (e.g. via an update, deletion, or other change to an existing core software platform module 104); addition of a new core software platform module 104; addition, deletion, or changes to interfaces between two or more core software platform modules 104 or between one or more core software platform modules 104 and one or more external software components; etc. can be applied to the development system. Similar to 304 and 306 in FIG. 3, at 404 customizing and customer-specific developments built upon the updated core software platform (e.g. a "target release") are undertaken in the development system 120. In some examples, a customer may have a large volume of customizing and customer-specific development built upon the core software platform, and at 406, a quality control or other test system(s) 122 can be updated.

The quality control or other test system(s) 122 can be restored to uptime to perform testing at 410. Import of customer transport requests from the development system 120 into the quality control of other test system(s) 122 is not necessary. Instead, the testing in the quality control of other test system(s) 122 can be made possible as soon as the quality control or other test system(s) 122 (e.g. at 406) are returned to uptime. At 412, the productive system is updated with both the update package to the core software platform and the customer-specific transport requests in parallel. This period of technical downtime of the productive system is also the only part of the update process that needs to be a business downtime period for the productive system. At 414, the productive system is returned to business use, and post processing procedures can be executed. During the post processing procedures, the productive system is technically useable, and with customer-specific transport requests it is also useable for business operations. A separate import of customer-specific transport requests from the development system 120 into the productive system is not necessary.

Consistent with implementations of the current subject matter, an update procedure can include the following downtime states. An update downtime can be technically needed regardless of whether customer-specific transport requests are included. With included customer-specific transport requests, the update downtime can be somewhat longer that might be the case under a conventional approach, because some parts are imported during this update downtime, such as for example "execution of program after import" (XPRA) reports or the like, post import methods, etc. can be executed during the update downtime (e.g. if the customer-specific transport requests include such). Versioning for customer-specific transport requests can also be done in this update downtime. Update post processing can be completed during technical uptime, because the productive system is already in a consistent state of the target release. Because the customer-specific transport requests have already been imported during the update downtime, this post processing procedures can be completed during business uptime and the productive system is available for business use.

In an implementation of the current subject matter in which the core software platform includes or is based upon an ABAP (Advanced Business Application Programming language, available from SAP AG of Walldorf, Germany) application server, included customer-specific transport requests are fitted to the target level of the update. During an update procedure, the ABAP system can be updated to a status with several components having specific releases and specific support package levels. All included customer-specific transport requests are advantageously fit to these. Included customer-specific transports also are advantageously able to be imported together. The included customer-specific transport requests can be handled similarly to an "import all" import method.

In an implementation, a dictionary import can be first completed for all core software platform packages and then a dictionary import is completed for all included customer-specific transport requests. After activation of the dictionary imports, further import processes can be completed. Thus, for example, a main import can be completed for the first customer-specific transport request after the dictionary changes have already been completed for all customer-specific transport requests. The included customer-specific transport requests are advantageously completed such that this import method can proceed without errors.

Figure 5:
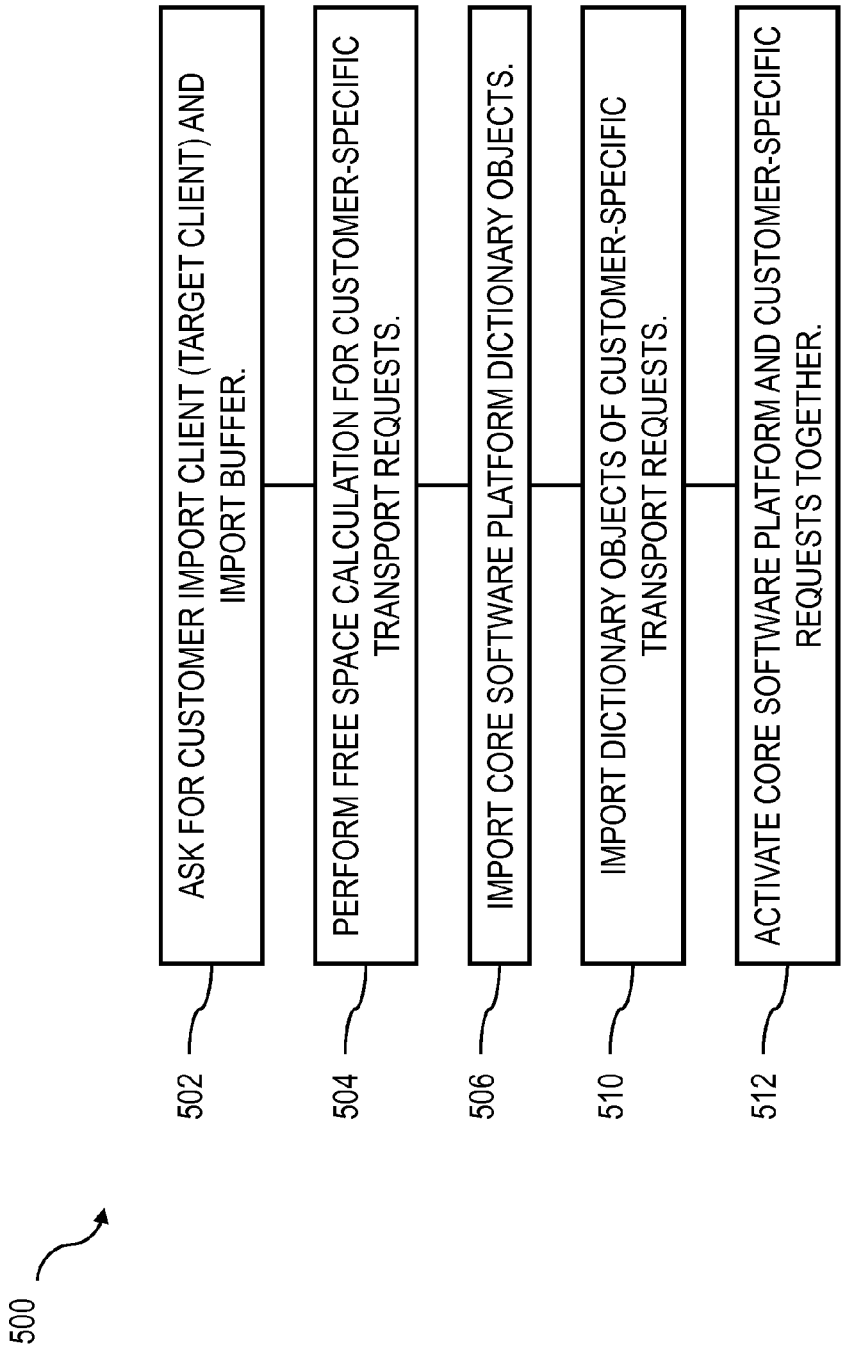
FIG. 5 is a process flow diagram illustrating aspects of another method having one or more features consistent with implementations of the current subject matter.

FIG. 5 shows a process flow chart 500 illustrating features of a method that can optionally be performed on a productive system consistent with some implementations of the current subject matter. In particular, an ordering of the import sub-processes can be useful in reducing the total amount of business downtime experienced by a productive system. For example, in a multi-tenant or multi-client system (e.g. similar to the example of FIG. 2), it can be advantageous at 502 to determine (e.g. by receiving an input or a response to a request for input) which client in the multi-tenant system is a target client or tenant for a given customer-specific transport request and which is the (buffer) file containing the customer-specific transport requests to be included into the update procedure. At 504, the update procedure can include checking the free space requirements in the database for the core software platform packages and also for the customer-specific transport requests. Doing so can assist in avoiding errors due to full database table spaces, for the included customer-specific transports. At 506, dictionary objects of the core software platform transport packages (e.g. the functionality to be installed as part of an enhancement package, a support package, or the like) are imported to a shadow instance of the productive system. The shadow instance cannot be used productively at this time. However, the original instance of the productive system can be used productively while the shadow instance is used by the update procedures, for example those performed by an update module 112 or the like. Business use can be transitioned from an "old" productive instance to the "new" shadow instance upon import to the shadow instance of the updated core software platform. Then, during business uptime, dictionary objects of the customer-specific transport requests can be imported to the "new" shadow system at 510. As separate transport control program parameter files are used, the import can be complete with the customer target client and customer specific transport parameters (e.g. VERS_AT_IMP and RECCLIENT, which are some examples of such parameters) can be used in some implementations. A transport control program can, consistent with one or more implementations of the current subject matter, be a tool or other approach by which a customer can apply one or more customer transport requests. One or more objects and/or customizing entries can be included within a customer transport request. Some or all of these entries can be temporarily marked as "already imported" such that the marked entries can be skipped during the uptime import into the shadow instance. Later on, these same entries can be marked as "not yet imported" such that they can be imported during downtime. At 512, the update procedure can activate both the core software platform dictionary object and the customer-specific dictionary objects together during uptime.

Figure 6:
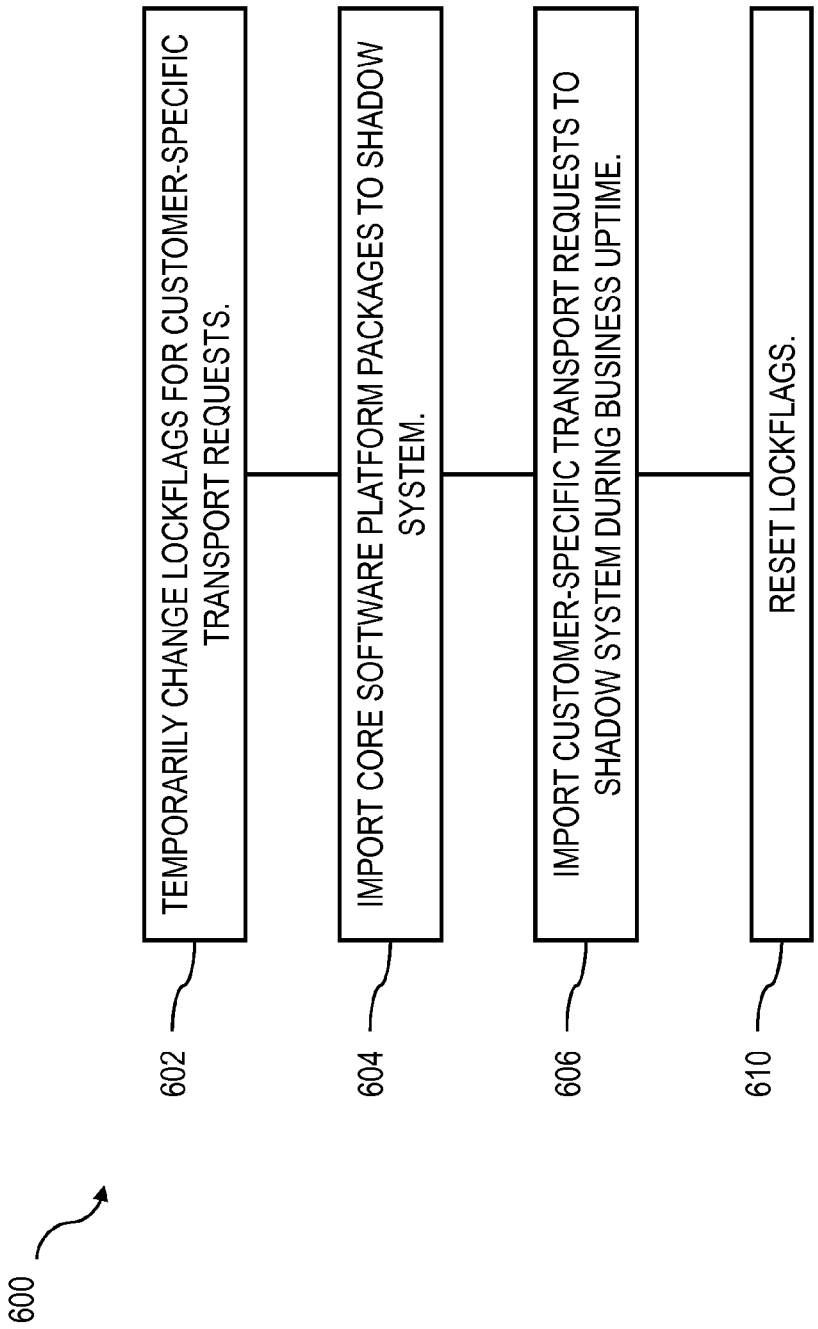
FIG. 6 is a process flow diagram illustrating aspects of another method having one or more features consistent with implementations of the current subject matter.

FIG. 6 shows a process flow chart 600 illustrating features consistent with implementations of the current subject matter dealing with the use of a "lockflag" for determining whether the transport/import have already been completed. As used herein a lockflag can assist in determining whether an object will be imported in a specific step or not. In order to ensure that only customer-specific objects for which a shadow import is ensured to worked will be imported to the shadow system, the lockflags are changed for all other objects temporarily, so that they will not be imported into the shadow system during the uptime, but later, in the downtime. As such, at 602 the lockflags for the customer-specific transport requests are temporality changed, with the target customer requests being flagged for import and all other customer-specific requests of customer's other than the target customer being flagged to not be imported. At 604, non-dictionary objects of core software platform packages are imported to the shadow system during uptime. Core packages software platform packages can include both dictionary objects and non-dictionary objects. Also during uptime, at 606 one or more (e.g. at least some and possibly but not necessarily all) non-dictionary repository objects of the customer-specific transport requests are imported to the shadow system into a target client of the customer system. Customer transport parameters (e.g. VERS_AT_IMP, RECCLIENT, etc.) can be used in this process. At 610, the temporarily set lockflags can be reset so that the previously flagged objects will be imported later, in the downtime. The lockflags for objects that were already imported to the shadow system during the uptime can be kept without changes.

Figure 7:
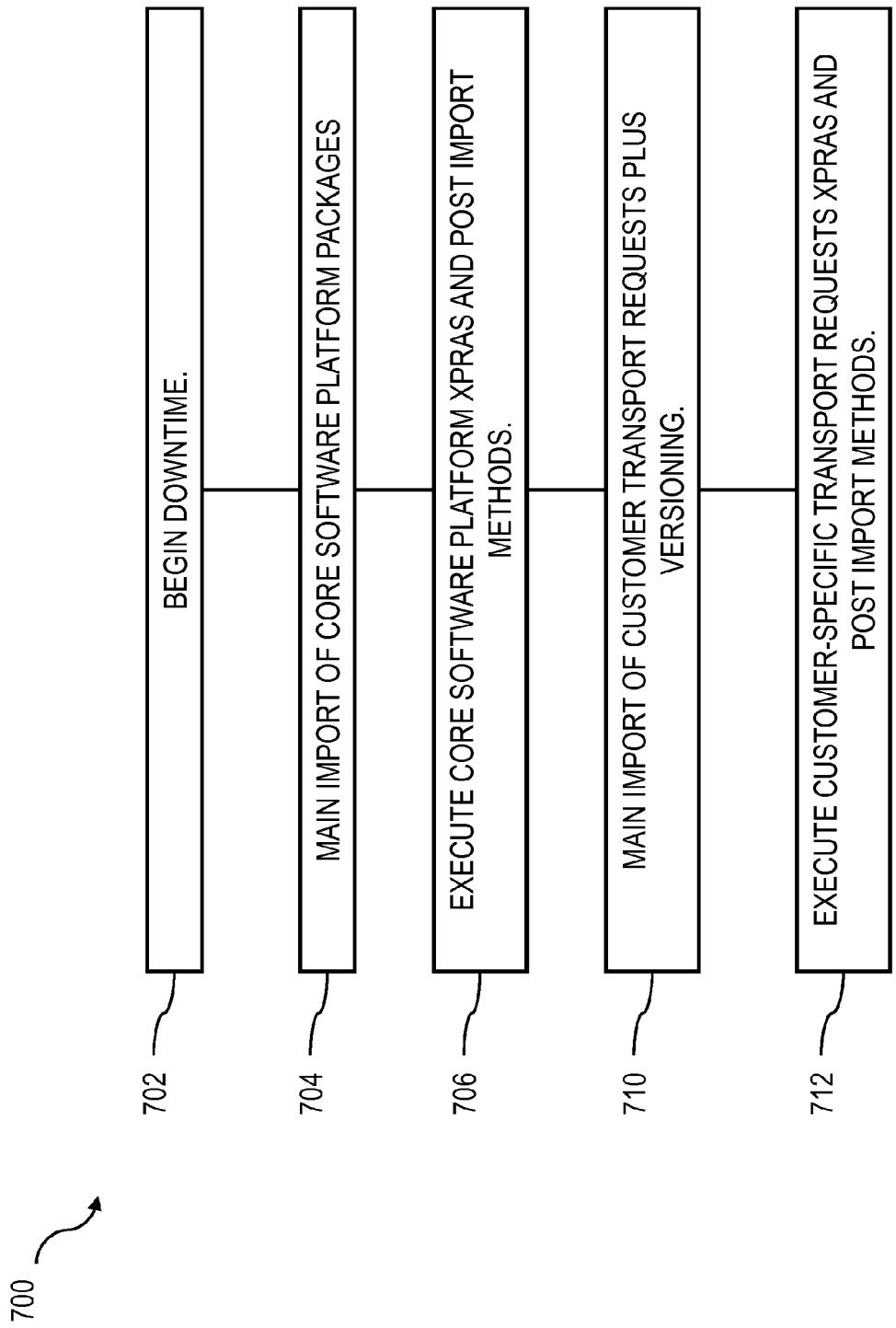
FIG. 7 is a process flow diagram illustrating aspects of another method having one or more features consistent with implementations of the current subject matter.

FIG. 7 shows a process flow chart 700 illustrating additional features that can be included in a method consistent with one or more implementations of the current subject matter. The features of FIG. 7 relate to import of "main" content to the updated system, which occurs at downtime. Unlike in previous approaches, the customer-specific main content can be imported with parallel import processes for each customer transport request. In effect, a first import of structural changes (e.g. dictionary objects and the like) to the core software platform and to implement the customer-specific transport requests on the updated system can be performed using one or more features illustrated and discussed in reference to FIG. 5 and FIG. 6. At 702, a downtime state begins. During this downtime state, actions are performed which cannot be completed with the productive system in business use. Such changes can include, but are not limited to table structure changes, kernel changes, and the like. During this downtime, objects, customizing, and the like of the core software platform packages that were not previously imported to the shadow system are imported at 704. At 710, XPRAs and other post import methods of the core software platform packages can be executed. At 710, the objects, customizing, etc. of the customer-specific transport requests which were not previously imported to the shadow system are imported into the customer target client using the customer transport parameters (e.g. VERS_AT_IMP, RECCLIENT, etc.) of the target customer. Versioning for the customer-specific transport requests can also be performed here. At 712, XPRAs and other post import methods of the customer-specific transport requests can be executed.

A switch framework (SFW) can be used in the activation phase and can include a post import method. During the activation, some SFW tables can receive temporary data with status information. The post import method advantageously treats included customer-specific transport requests in a similar manner as if customer-specific transport requests were imported separately later on (e.g. as in a conventional approach).

Some SFW tables can be backed up (copied) after they have been filled by the activation so that their contents can be preserved. The post import method of the SFW can be called for core software platform packages and can delete the data from some original SFW tables. Before the post import methods for the customer transport requests are executed, the data of the backed up SFW tables can be copied back so that the SFW method being called for the customer transport requests, has the original data available.

In further implementations of the current subject matter, business and technical downtime reduction can also or alternatively be achieved by importing substantial parts of the customer-specific transport requests during an uptime state of the target system. For example, dictionary objects, repository objects, etc. can be imported to a shadow instance while the normal instance is used for productive activities. After the downtime, these dictionary objects, repository objects, etc. will be available in the normal instance of the updated system, (e.g. the system updated to the target release). Versioning and execution of one or more XPRA or other post-processing procedures for customer-specific transport requests can consume a great deal of time in downtime phases using conventional approaches. Accordingly, some implementations of the current subject matter can reduce the downtime caused by versioning procedures by performing versioning during an uptime state in a shadow instance for objects imported during the uptime into the shadow instance. Those objects that cannot be imported in uptime can be imported in downtime. Versioning for such objects can be done in downtime. However, using the current subject matter, fewer objects require versioning in downtime, so the downtime versioning process can be performed much more rapidly. In some examples, the downtime required for XPRA procedures, including but not limited to post import methods can be reduced by running these processes in parallel during the downtime, instead of as part of a sequential execution.

Figure 8:
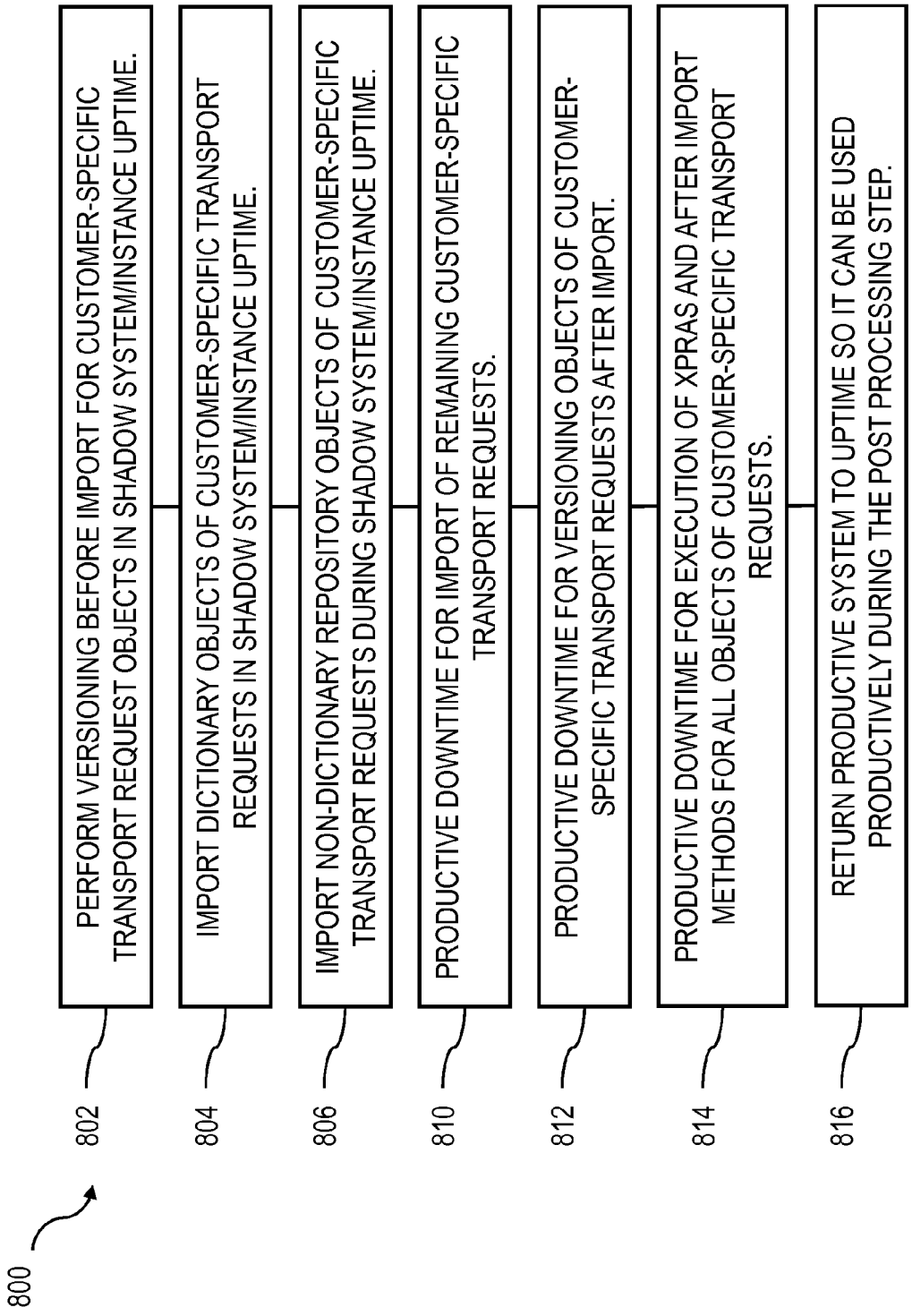
FIG. 8 is a process flow diagram illustrating aspects of another method having one or more features consistent with implementations of the current subject matter.

FIG. 8 shows a process flow chart 800 illustrating aspects of an update procedure with customer-specific transport requests. At 802, versioning is performed prior to an import of customer-specific transport requests into a system undergoing an update process. At 804, dictionary objects of customer-specific transport requests can be imported during an update process into a shadow system or shadow instance. At least some non-dictionary repository objects of the customer-specific transport requests can also be imported during uptime into the shadow system or shadow instance at 806. At 810, a productive downtime state is entered to allow for import of the remaining customer-specific transport requests. At 812, the productive downtime state continues to allow for versioning of the imported objects of the customer-specific transport requests, and at 814, still during the downtime state, XPRAs, after import methods, and the like for all objects of the customer-specific transport requests are executed. In general, versioning for objects in the included customer-specific transport requests is done sequentially during this downtime. The XPRAs, post import methods, and the like are also typically executed sequentially for the included customer transport requests during this downtime. At 816, the productive system is returned to uptime so that it can be used productively during post processing steps.

Figure 9:
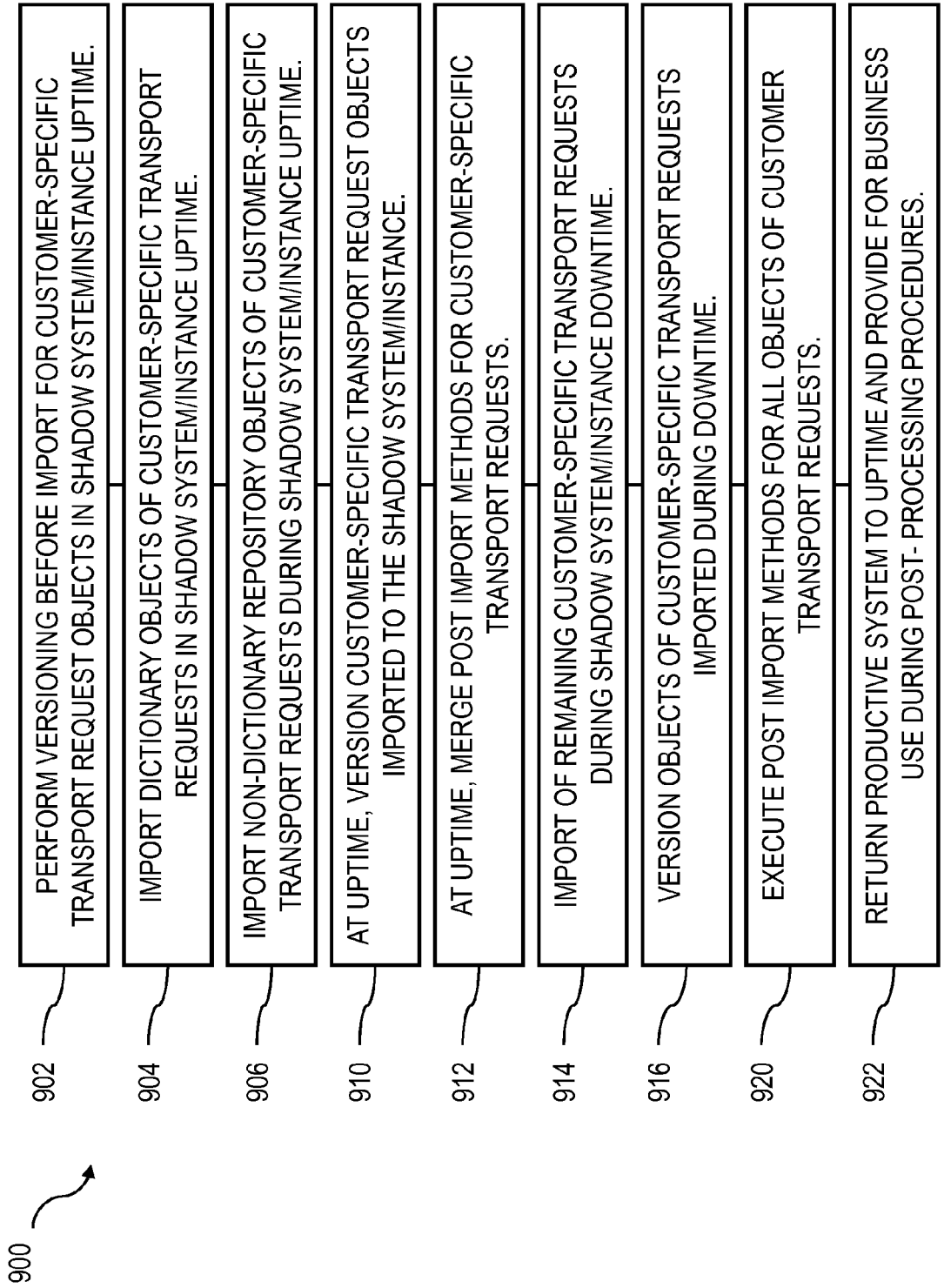
FIG. 9 is a process flow diagram illustrating aspects of another method having one or more features consistent with implementations of the current subject matter.

In contrast to the process illustrated in FIG. 8, some implementations of the current subject matter can apply an approach similar to that illustrated in the process flow chart 900 of FIG. 9 to reduce the total amount of downtime required for a core software platform update with customer-specific transport requests. As in 802-806 of FIG. 8, versioning is performed at 902 prior to an import of customer-specific transport requests into a system undergoing an update process. At 904, dictionary objects of customer-specific transport requests can be imported during an update process into a shadow system or shadow instance. At least some non-dictionary repository objects of the customer-specific transport requests can also be imported during uptime into the shadow system or shadow instance at 906. Unlike in the process 800 of FIG. 8, however, at 910 customer-specific transport request objects imported to the shadow system or shadow instance are versioned while the shadow system or shadow instance is in an uptime state. Versioning for these objects can be done sequentially during uptime. Also at uptime, any XPRAs, post import methods, or the like can optionally be merged for customer-specific transport requests at 912. This merging can optionally include preparing the XPRAs, post import methods, or the like for parallel execution during uptime. The shadow system or shadow instance is taken into downtime for an import of any remaining customer-specific transport requests at 914. Also during this downtime, the remaining object imported at 912 can be versioned at 916, and at 920, XPRAs, post import methods, and the like for all objects of customer-specific transport requests can optionally be executed. Versioning for the remaining objects in the included customer-specific transport requests (e.g. those imported in downtime) can optionally be done sequentially during downtime. The XPRAs, post import methods, and the like can optionally be executed in parallel for the included customer transport requests during the downtime. The productive system can be returned to business use uptime at 922, and post processing procedures can operate during this business use uptime.

Consistent with implementations of the current subject matter, one or more or, optionally, many (e.g. some or even in some case all) objects of the customer-specific transport requests that are included in the update procedure, are imported in the uptime. For these objects, the versioning after import can be done in the uptime, for example in a second shadow system or shadow instance. In this manner, less work can be left for the versioning after import process that occurs in the downtime. In some examples, the XPRAs, post import methods, and the like can be executed during downtime. These features can be grouped in new transport requests during uptime. Such transport requests can optionally be executed in parallel. During downtime, the execution of XPRAs, post import methods, and the like for the customer-specific transport requests included in the update procedure can be performed in parallel and thus made significantly faster.

One or more implementations of the current subject matter can be used in conjunction with an ABAP application server, for example to enable features such as or similar to the ability to perform various versioning tasks during an uptime state. In at least some ABAP implementations, versioning in uptime can only be done for objects imported in uptime. For such systems, all objects in customer-specific transport requests that are included in an update procedure may not be capable of being versioned during uptime.

If the customer uses XPRAs or Post Import Methods, which need to know the transport request name, project, short text, owner, . . . it may not be feasible to execute the merging of the XPRAs and other post import methods, for example because of the creation of new transport requests (with different transport request names/numbers, projects, owners, short descriptions, . . . ) and thus these XPRAs or Post Import Methods would not get the original transport request information. An example for this special case is the CTS BADI CTS_IMPORT_FEEDBACK.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer program product comprising a machine-readable medium storing instructions that, when executed by a system comprising a programmable processor, cause the system to perform operations comprising:

creating customer-specific developments based on a target update release in a development system to which an update of a core software platform of a software architecture has been applied, the customer-specific developments comprising a customization of the core software platform that is specific to a given customer organization using the software architecture;

updating and testing a quality control or other test system, the updating comprising importing, during an uptime state, customer-specific transport requests representing the customer-specific developments;

updating a productive system to the target update release, the updating comprising importing, during the uptime state, the customer-specific transport requests to the productive system; and returning the productive system to business use and executing one or more post processing procedures concurrently with the business use.

2. The computer program product as in claim 1, wherein the quality control or other test system is placed in a downtime state for the updating of the quality control or other test system and returned to the uptime state for the testing of the quality control or other test system.

3. The computer program product as in claim 1, wherein the productive system is placed in state for the updating of the productive system and is otherwise available in a business uptime state during the creating of the customer-specific developments and the updating and testing of the quality control or other test system.

4. The computer program product as in claim 1, wherein the operations further comprise: fitting customer-specific transport requests to a target level of the update, the fitting occurring when the core software platform includes or is based on an ABAP application server.

5. The computer program product as in claim 1, wherein the operations further comprise: completing a first dictionary import for all core software platform packages prior to a second dictionary import for all included customer-specific transport requests.

6. The computer program product as in claim 5, wherein the operations further comprise: completing further import processes after activation of the first and second dictionary imports.

7. A system comprising:
at least one programmable processor; and
a machine-readable medium storing instructions that, when executed by the at least programmable processor, cause the at least one programmable processor to perform operations comprising:

creating customer-specific developments based on a target update release in a development system to which an update of a core software platform of a software architecture has been applied, the customer-specific developments comprising a customization of the core software platform that is specific to a given customer organization using the software architecture;

updating and testing a quality control or other test system, the updating comprising importing, during an uptime state, customer-specific transport requests representing the customer-specific developments;

updating a productive system to the target update release, the updating comprising importing, during the uptime state, the customer-specific transport requests to the productive system; and returning the productive system to business use and executing one or more post processing procedures concurrently with the business use.

8. The system as in claim 7, wherein the quality control or other test system is placed in a downtime state for the updating of the quality control or other test system and returned to the uptime state for the testing of the quality control or other test system.

9. The system as in claim 7, wherein the productive system is placed in state for the updating of the productive system and is otherwise available in a business uptime state during the creating of the customer-specific developments and the updating and testing of the quality control or other test system.

10. The system as in claim 7, wherein the operations further comprise: fitting customer-specific transport requests to a target level of the update, the fitting occurring when the core software platform includes or is based on an ABAP application server.

11. The system as in claim 7, wherein the operations further comprise: completing a first dictionary import for all core software platform packages prior to a second dictionary import for all included customer-specific transport requests.

12. The system as in claim 11, wherein the operations further comprise: completing further import processes after activation of the first and second dictionary imports.

13. A computer-implemented method comprising:
   creating customer-specific developments based on a target update release in a development system to which an update of a core software platform of a software architecture has been applied, the customer-specific developments comprising a customization of the core software platform that is specific to a given customer organization using the software architecture;
   updating and testing a quality control or other test system, the updating comprising importing, during an uptime state, customer-specific transport requests representing the customer-specific developments;
   updating a productive system to the target update release, the updating comprising importing, during the uptime state, the customer-specific transport requests to the productive system; and
   returning the productive system to business use and executing one or more post processing procedures concurrently with the business use.

14. The computer-implemented method as in claim 13, wherein the quality control or other test system is placed in a downtime state for the updating of the quality control or other test system and returned to the uptime state for the testing of the quality control or other test system.

15. The computer-implemented method as in claim 13, wherein the productive system is placed in state for the updating of the productive system and is otherwise available in a business uptime state during the creating of the customer-specific developments and the updating and testing of the quality control or other test system.

16. The computer-implemented method as in claim 13, further comprising: fitting customer-specific transport requests to a target level of the update, the fitting occurring when the core software platform includes or is based on an ABAP application server.

17. The computer-implemented method as in claim 13, further comprising: completing a first dictionary import for all core software platform packages prior to a second dictionary import for all included customer-specific transport requests.

18. The computer-implemented method as in claim 17, further comprising: completing further import processes after activation of the first and second dictionary imports.

19. The computer-implemented method as in claim 13, wherein one or more of the creating, the updating and testing of the quality control or other test system, the updating of the productive system to the target update release, and the returning is performed by at least one programmable processor.

* * * * *